(12) United States Patent
Sakurai

(10) Patent No.: US 11,178,345 B2
(45) Date of Patent: Nov. 16, 2021

(54) VEHICLE-MOUNTED DEVICE

(71) Applicant: Panasonic Intellectual Property Management Co., Ltd., Osaka (JP)

(72) Inventor: Kazuho Sakurai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/014,685

(22) Filed: Sep. 8, 2020

(65) Prior Publication Data

US 2020/0404192 A1   Dec. 24, 2020

Related U.S. Application Data

(63) Continuation of application No. PCT/JP2019/008323, filed on Mar. 4, 2019.

(30) Foreign Application Priority Data

Mar. 9, 2018 (JP) .............................. JP2018-043551

(51) Int. Cl.
  *H04N 7/18* (2006.01)
  *H04N 5/272* (2006.01)
  *H04N 5/265* (2006.01)

(52) U.S. Cl.
  CPC ............. *H04N 5/272* (2013.01); *H04N 5/265* (2013.01); *H04N 7/18* (2013.01)

(58) Field of Classification Search
  CPC .......... H04N 7/181; H04N 7/18; H04N 5/272; H04N 5/265; H04N 9/76
  USPC ........ 348/148, 115, 117–119, 143, 584, 598, 348/599; 345/7–9; 382/104
  See application file for complete search history.

(56) References Cited

U.S. PATENT DOCUMENTS

| 2008/0151115 | A1  | 6/2008 | Agung et al. |
| 2010/0182340 | A1* | 7/2010 | Bachelder ............. G09G 3/003 345/633 |
| 2012/0113261 | A1* | 5/2012 | Satoh ..................... G06T 11/00 348/148 |

FOREIGN PATENT DOCUMENTS

| JP | 2008-131498 | 6/2008 |
| JP | 2016-187079 | 10/2016 |
| JP | 2017-079363 | 4/2017 |

OTHER PUBLICATIONS

International Search Report (ISR) from International Searching Authority (Japan Patent Office) in International Pat. Appl. No. PCT/JP2019/008323, dated May 14, 2019, along with an English language translation.

* cited by examiner

*Primary Examiner* — Sherrie Hsia
(74) *Attorney, Agent, or Firm* — Greenblum & Bernstein, P.L.C.

(57) ABSTRACT

A video processing circuit outputs a video signal from an imaging device for imaging a scene outside a vehicle to a display unit. A main processing circuit generates an image from vehicle information and outputs the image to the video processing circuit, a starting time of the main processing circuit being longer than that of the video processing circuit. The video processing circuit superimposes the image from the main processing circuit on the video signal from the imaging device and outputs a resultant video to the display unit.

9 Claims, 6 Drawing Sheets

FIG.5

| MODE | Dout7 | Dout6 | Dout5 | Dout4 | Dout3 | Dout2 | Dout1 | Dout0 |
|---|---|---|---|---|---|---|---|---|
| AV MODE | R[7] | R[6] | R[5] | R[4] | R[3] | R[2] | R[1] | R[0] |
| CAMERA MODE | R[5] | R[4] | R[3] | R[2] | R[1] | R[0] | αR[1] | αR[0] |
| AV MODE | G[7] | G[6] | G[5] | G[4] | G[3] | G[2] | G[1] | G[0] |
| CAMERA MODE | G[5] | G[4] | G[3] | G[2] | G[1] | G[0] | αG[1] | αG[0] |
| AV MODE | B[7] | B[6] | B[5] | B[4] | B[3] | B[2] | B[1] | B[0] |
| CAMERA MODE | B[5] | B[4] | B[3] | B[2] | B[1] | B[0] | αB[1] | αB[0] |

BIT ARRAY

VEHICLE-MOUNTED DEVICE

CROSS-REFERENCE TO RELATED APPLICATIONS

This application is a Bypass Continuation of National Stage of International Application No. PCT/JP2019/008323 filed Mar. 4, 2019, which claims priority to Japanese Patent Application No. 2018-043551 filed Mar. 9, 2018. The content of each noted application is hereby incorporated by reference in its entirety.

BACKGROUND

1. Field

The present disclosure relates to a vehicle-mounted device for processing a video captured by a vehicle-mounted camera.

2. Description of the Related Art

Recently, vehicle-mounted infotainment devices capable of displaying a video captured by a vehicle-mounted camera have come to be widely used. Commonly used vehicle-mounted infotainment devices process a video from the camera in the main chip and output the video to a display (see, for example, patent literature 1). The main chip processes the video from the camera in units of frames so that the realtimeness of the video displayed on the display is generally poor.

In the case the main chip is implemented by a system-on-a-chip (SoC) that carries a CPU to a heavy processing load is imposed by a real-time OS or the like, it takes time to start the system, and the video from the camera cannot be displayed immediately after the system is started.

[Patent Literature 1] JP2008-131498

It is conceivable to provide a bypass route to output a video signal from the vehicle-mounted camera to the display, bypassing the main chip. This means, however, that the video from the camera cannot be subject to an advanced video process performed by the main chip. For example, it will not be possible to superimpose a guideline or an alert message adapted to the vehicle orientation on the video from the camera.

It is also conceivable to provide a video processing IC on the bypass route apart from the main chip. In this case, the system cost will be increased if a high-spec video processing IC is used. In the case of using a low-spec video processing IC, the graphic process that can be applied to the video from the camera will be limited.

SUMMARY

The present disclosure addresses the above-described issue, and a general purpose thereof is to provide a technology capable of subjecting the video input from the imaging device to an advanced graphic process, while also maintaining the realtimeness of the video.

A vehicle-mounted device according to an embodiment of the present disclosure includes: a video processing circuit that outputs a video signal from an imaging device for imaging a scene outside a vehicle to a display unit; and a main processing circuit that generates an image from vehicle information and outputs the image to the video processing circuit, a starting time of the main processing circuit being longer than that of the video processing circuit. The video processing circuit superimposes the image from the main processing circuit on the video signal from the imaging device and outputs a resultant video to the display unit.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 5 shows an example of a bit array of a video signal output from the main SoC.

DETAILED DESCRIPTION

The invention will now be described by reference to the preferred embodiments. This does not intend to limit the scope of the present invention, but to exemplify the invention.

Figure 1:
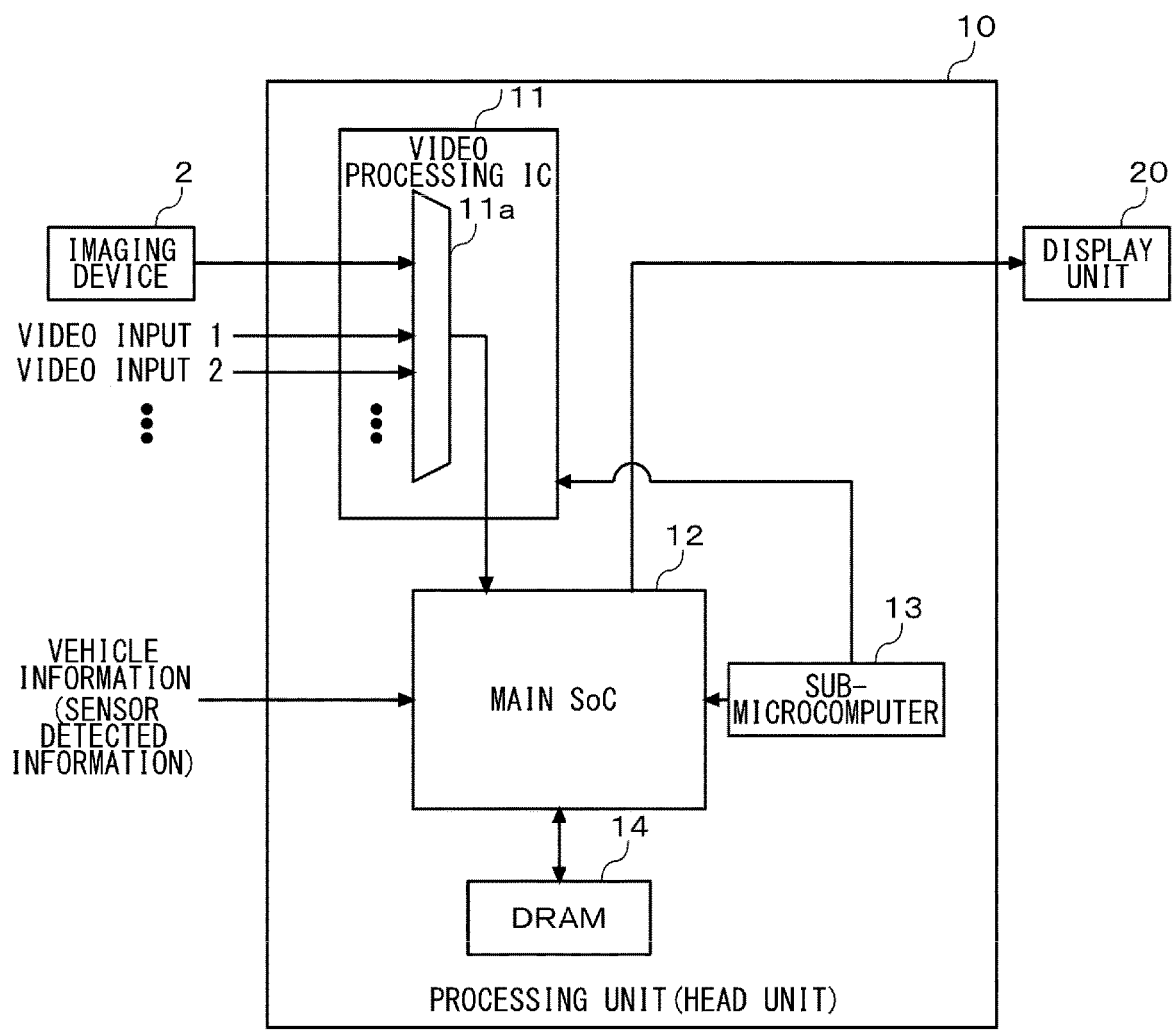
FIG. 1 shows a vehicle-mounted device according to a comparative example 1.

FIG. 1 shows a vehicle-mounted device 1 according to a comparative example 1. The vehicle-mounted device 1 is an infotainment device such as a display audio and a car navigation system. An imaging device 2 is provided in the rear portion of the vehicle and is a rear camera for imaging a scene behind the vehicle. The imaging device 2 includes a solid state image sensing device (e.g., a CMOS image sensor, a CCD image sensor) and a signal processing circuit. The solid state image sensing device converts incident light condensed by the lens into an electric signal. The signal processing circuit subjects a video signal generated by photoelectric conversion in the solid state image sensing device to a signal process such as A/D conversion, noise rejection and outputs the resultant signal to the vehicle-mounted device 1.

The vehicle-mounted device 1 includes a processing unit (head unit) 10 and a display unit 20. The display unit 20 includes a display such as a liquid crystal display and an organic EL display and displays a video supplied from the vehicle-mounted device 1. The display unit 20 may be formed to be integrated with the housing of the vehicle-mounted device 1 or may be coupled to the vehicle-mounted device 1 as an external device.

The processing unit 10 includes a video processing IC 11, a main SoC 12, a sub-microcomputer 13, and a dynamic random access memory (DRAM) 14. The video processing IC includes a selector 11a. The video signal form the imaging device 2 is input to the selector 11a. A video signal form a video source other than the imaging device 2 is also input to the selector 11a. For example, a video signal from a DVD/BD drive or a TV tuner is input. The selector 11a selects and outputs one of the video signals input from a plurality of video sources.

The video processing IC 11 includes an expansion and decoding function and an image quality adjustment function for a video signal that is compressed and coded. The video processing IC 11 subjects the video signal output from the selector 11a to a signal process corresponding to the function as necessary. The video processing IC 11 outputs the video signal selected by the selector 11a to the main SoC 12.

The main SoC 12 includes at least a CPU, a graphic processing unit (GPU), a ROM, and a communication controller. The main SoC 12 performs various processes in coordination with the DRAM 14. FIG. 1 depicts a configuration in which the DRAM 14 is provided outside the main SoC 12, but the DRAM 14 may be provided inside the main SoC 12.

Vehicle information is input to the main SoC 12 via a vehicle-mounted network (e.g., a controller area network (CAN)). The vehicle information includes sensor detected information generated by the electronic control unit (ECU) connected to various sensors. Various sensors for detecting the condition of the vehicle or the situation around the vehicle are provided in the vehicle. For example, a sonar, a millimeter radar, a GPS sensor, a vehicle speed sensor, a steering angle sensor, etc. are provided.

The sonar radiates ultrasonic waves around the vehicle and receives a reflected signal. The sonar measures the distance to a target located around, based on the reflected signal received. The millimeter radar radiates radio waves (millimeter waves) around the vehicle and receives a reflected signal. The millimeter radar measures the distance to a target located around based on the reflected signal received. The millimeter radar is capable of detecting a target at a greater distance. The GPS sensor detects positional information on the vehicle. More specifically, the GPS sensor receives the time of origin from each of a plurality of GPS satellite and calculates the latitude and longitude of the point of reception based on a set of the time of origin received. The vehicle speed sensor generates a pulse signal determined by the number of revolutions of the axle. The steering sensor detects the rotation angle of the steering wheel.

The communication controller (e.g., the CAN controller) in the main SoC 12 receives communication data transmitted from the ECU in accordance with a predetermined communication standard and outputs the vehicle information included in the communication data to the CPU.

The main SoC 12 can generate an image based on the input vehicle information and superimposes the generated image on the video signal input from the imaging device 2 via the video processing IC 11. The main SoC 12, for example, generates graphic such as on screen display (OSD) including an image quality adjustment menu, etc., an alert message, a guideline showing a parking position, and an icon indicating the distance to an obstacle around the vehicle. The main SoC 12 outputs the video signal on which graphic is superimposed to the display unit 20.

The sub-microcomputer 13 manages the power supply and various settings of the video processing IC 11 and the main SoC 12.

In the U.S., the Kids Transportation Safety Act (KT law) has come into effect to protect kids from accidents that occur when the vehicle is driven backward. Under the KT law, it is mandatory to provide a rear camera in a vehicle and to display an image from the rear camera on a display in the vehicle within 2 seconds after the gear is shifted to a reverse position.

As of 2018, a lot of main SoCs require 10 seconds or longer to start. If the gear is shifted to a reverse position immediately after the ignition is turned on, it is difficult to comply with the KT law. Further, the main SoC 12 uses the DRAM 14 to superimpose an image in units of frames. Other than video processes, the main SoC 12 also performs various processes such as those of the NAVI function. This creates a restriction on the DRAM bandwidth and makes it difficult to dedicate the main SoC 12 to video processing. Generally, therefore, a video delay of 4 or 5 frames is created, and the realtimeness is lost. A video signal from a vide source other than the imaging device 2 is also input to the main SoC 12. The main SoC 12 also performs expansion/reduction scaling of a video signal. Expansion/reduction of a video signal is performed by using a frame buffer in the DRAM 14. It is common for the main SoC 12, for which general-purpose video processing is required as described above, to superimpose graphic in units of frames.

Figure 2:
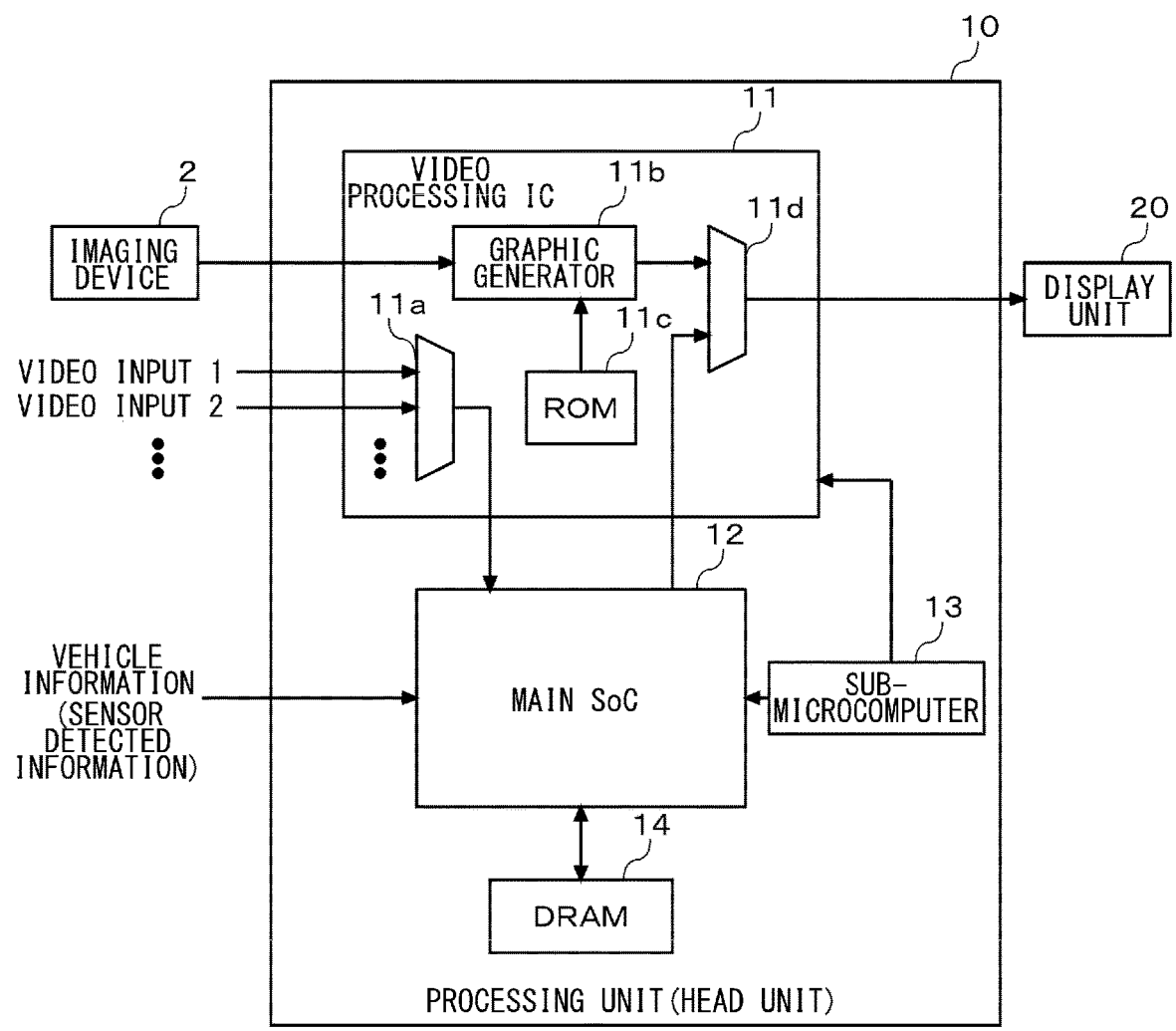
FIG. 2 shows a vehicle-mounted device according to a comparative example 2.

FIG. 2 shows a vehicle-mounted device 1 according to a comparative example 2. A comparative example 2 is an example in which the video signal input from the imaging device 2 to the processing unit 10 is output to the display unit 20, bypassing the SoC 12, which is slow to start. In this case, it is necessary to superimpose graphic on the video signal input from the imaging device 2 in the video processing IC 11. The video processing IC 11 according to the comparative example 2 includes a first selector 11a, a graphic generator lib, a ROM 11, and a second selector 11d. Video expansion and reduction suited to the specification for field angle of the display unit 20 is performed by scaling in which a line buffer is used. In the case of a system in which there is a great difference in the specification for field angle between the image sensing device and the display unit 20, the video signal is processed in the frame buffer in the video processing IC 11. A delay of about 1 frame at a maximum is common.

Unlike the case of the comparative example 1, the video signal from the imaging device 2 is not input to the first selector 11a. The graphic generator lib superimposes graphic on the video signal input from the imaging device 2, based on resource data for graphic stored in the ROM 11c. The second selector 11d selects the video signal input from the graphic generator 11b or the video signal input from the main SoC 12 and outputs the selected signal to the display unit 20.

According to the comparative example 2, the video signal output from the imaging device 2 bypasses the main SoC 12 characterized by a slow start so that the KT law can be complied with. Further, graphic is not superimposed by the SoC 12 that performs processes signals in units of frames but is superimposed by the video processing IC 11 capable of processing signals in units of lines so that the realtimeness is improved.

However, it is difficult for the video processing IC 11 to generate rich graphic that can be generated by the main SoC 12. It is basically difficult to superimpose anything other than still images. In order to generate rich graphic, it is necessary to build an expensive graphic engine in the video processing IC 11, but then that approach results in an increase in the cost, an increase in the starting time, and a decrease in the realtimeness.

Further, since the vehicle information is input to the main SoC 12, the video processing IC 11 cannot generate an image that reflects the sensor information. For example, it is not possible to generate a guideline showing a target parking position that changes dynamically in accordance with the steering angle. Processing the vehicle information in the video processing IC 11 requires a communication controller and a CPU and results in an increase in the cost, an increase in the starting time, and a decrease in the realtimeness.

Further, the video processing IC 11 needs to accommodate differences in graphical user interface between different places of destination. For example, the language of the alert message need be changed depending on the place of destination. In the case of superimposing an alert message by using the video processing IC 11, it is necessary to prepare message data in multiple languages in the ROM 11c in the video processing IC 11, and the sub-microcomputer 13 needs to designate a language used. In this case, the capacity of the ROM 11c is significantly increased. In the case of producing ROMs for respective places of destination, the management cost is increased.

Figure 3:
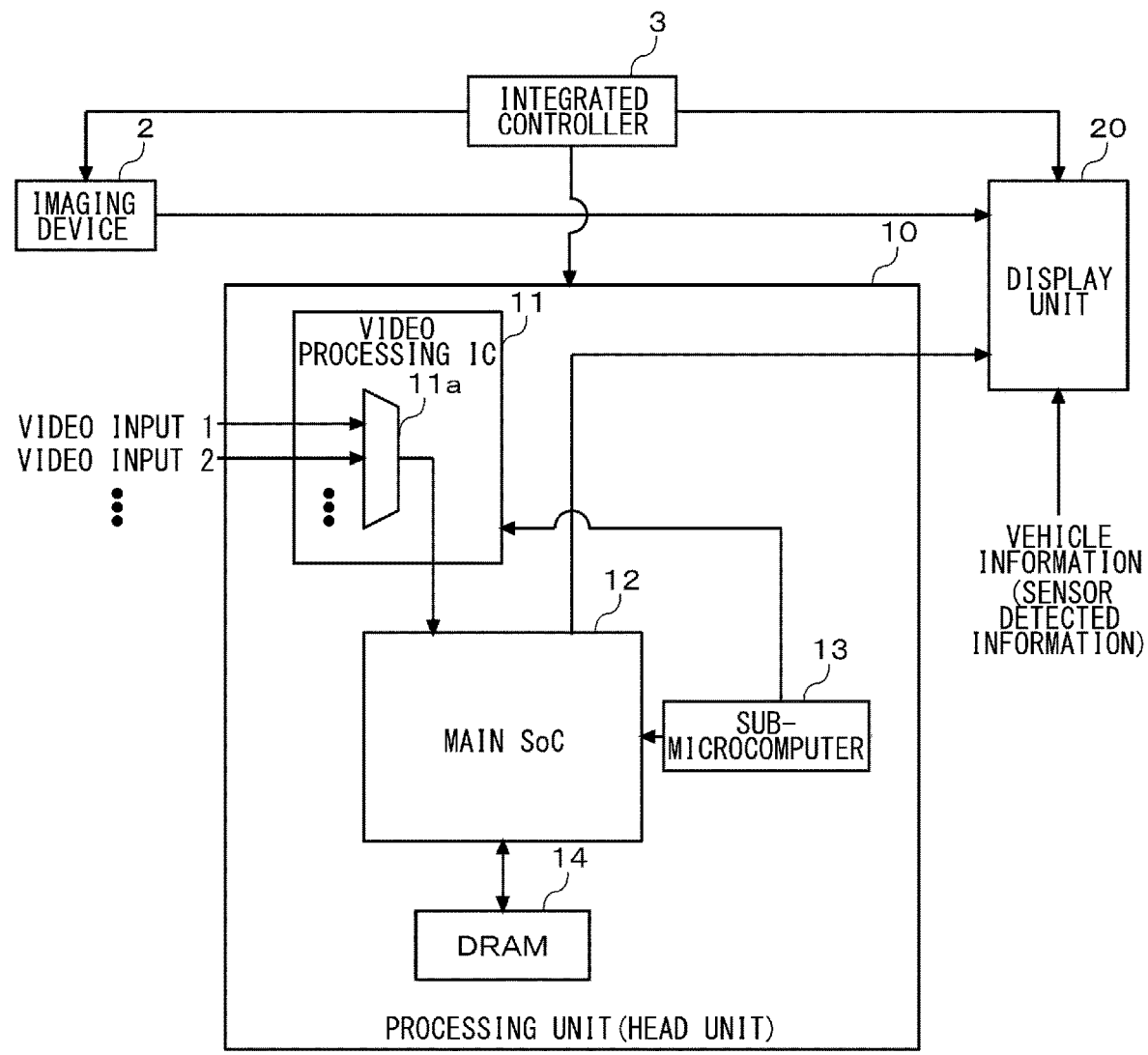
FIG. 3 shows a vehicle-mounted device according to a comparative example 3.

FIG. 3 shows a vehicle-mounted device 1 according to a comparative example 3. The comparative example 3 is an example in which the video signal output from the imaging device 2 is directly input to the display unit 20. The video processing IC 11 according to the comparative example 3 includes the selector 11a. As in the case of the comparative example 2, the video signal from the imaging device 2 is not input to the selector 11a. In the comparative example 3, the vehicle information is input to the display unit 20. The display unit 20 includes two-input video paths including a video path for the input from the imaging device 2 and a video path for the input from the processing unit 10. The display unit 20 has a function of generating an image based on the input vehicle information and superimposing the generated image on the video signal input from the imaging device 2. In the comparative example 3, an integrated controller 3 for directing the imaging device 2, the processing unit (head unit) 10, and the display unit 20 to switch video paths and to designate the timing of input and output.

In the comparative example 3, it is necessary to perform a communication process and a graphic generation process in the display unit 20 so that an increase in the cost, an increase in the starting time, and a decrease in the realtimeness of the display unit 20 result. Further, it is necessary for the display unit 20 accommodate differences in graphical user interface between different places of destination. In this case, the capacity of the ROM in the display unit 20 is significantly increased. In the case of producing ROMs for respective places of destination, the cost will be increased.

A trend in the design concept behind recent vehicle-mounted infotainment devices is to perform as many processes as possible in the head unit and minimize individual optimization of the peripheral devices. Therefore, the comparative example 3, which requires the display unit 20 to provide many functions, runs counter to this design concept. In the comparative example 3, it is also necessary to use the dedicated display unit 20, and end users cannot individually couple the display unit 20 as an external device.

Figure 4:
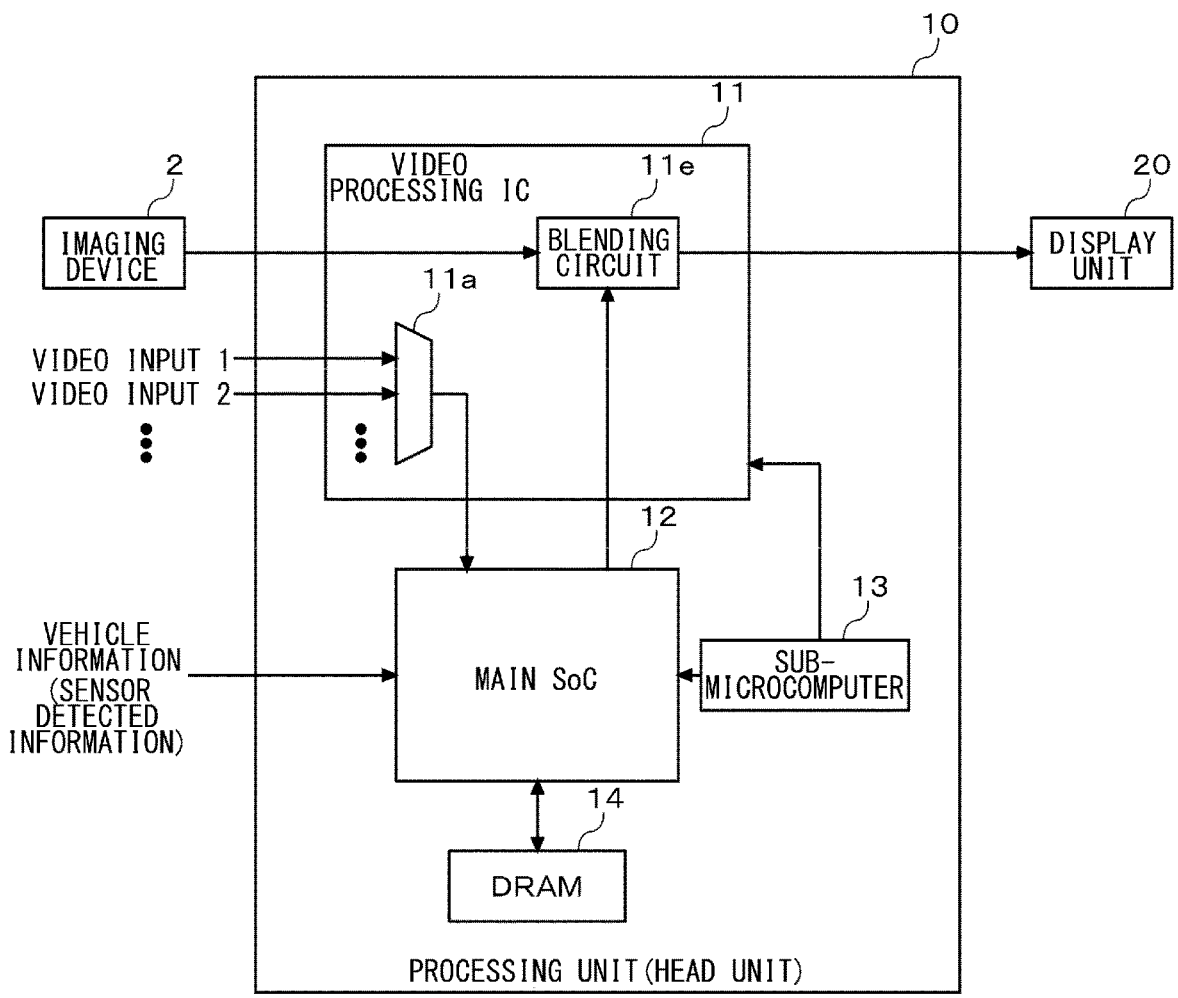
FIG. 4 shows a vehicle-mounted device according to the embodiment of the present disclosure.

FIG. 4 shows a vehicle-mounted device according to the embodiment of the present disclosure. In the embodiment, the video signal input from the imaging device 2 to the processing unit 10 is output to the display unit 20, bypassing the SoC 12, which is slow to start. The video processing IC 11 according to the embodiment includes the selector 11a and a blending circuit 11e.

Unlike the case of the comparative example 1, the video signal from the imaging device 2 is not input to the selector 11a. The blending circuit 11e blends the video signal input from the imaging device 2 with the image input from the main SoC 12 and outputs the blended signal to the display unit 20.

The main SoC 12 generates an image based on the input vehicle information. In that process, the main SoC 12 generates an image in units of frames corresponding to the screen size of the display unit 20 and outputs the image in a fixed format to the blending circuit 11e in the video processing IC 11. In the case the screen size of the display unit 20 is 1280×480 and the frame rate is 60 Hz, for example, the main SoC 12 generates 60 images per second in a frame area having a size of 1280×480 and outputs the images to the video processing IC 11.

The video processing IC 11 uses a scaler in the IC to convert the video signal input from the imaging device 2 into a format corresponding to the screen size and the frame rate of the display unit 20. In the case the format of the frame image captured by the imaging device 2 is the same as the format of the frame image displayed on the display unit 20, it is not necessary to convert the format in the video processing IC 11.

Since it is necessary to superimpose the image generated by the main SoC 12 on the video captured by the imaging device 2, it is necessary to designate a transparency α for each pixel to the blending circuit 11e. The transparency α is a coefficient having a value in the range 0-1, where 0 indicates completely transparent, and 1 indicates completely non-transparent.

Generally, the specification of many main SoCs 12 requires that the video output be fixed to 24 bits. In other words, it is usually assumed that the RGB888 format, in which each of the red component R, the green component G, and the blue component B is defined by 8 bits, is used. Generally, it is not assumed that the main SoC 12 outputs a transparency α as a video output. The low voltage differential signaling (LVDS) standard does not define transparency α, either.

FIG. 5 shows an example of a bit array of a video signal output from the main SoC 12. The AV mode is a mode in which a video signal from a video source other than the imaging device 2 is output from the main SoC 12 to the video processing IC 11. The camera mode is a mode in which an image to be superimposed on the video captured by the imaging device 2 is output from the main SoC 12 to the video processing IC 11. To switch between the AV mode and the camera mode, an instruction signal designating a switch is output to the video processing IC 11 via the main SoC 12 or the sub-microcomputer 13.

In the AV mode, the main SoC 12 outputs a video signal in the RGB888 format to the video processing IC 11. In the camera mode, the main SoC 12 outputs a video signal in the RGB6666 format to the video processing IC 11. The RGB6666 format is a format in which each of the red component R, the green component G, the blue component B, and the transparency α is defined by 6 bits In the case each pixel in the image is generated in the RGB888 format, the main SoC 12 discards the lower 2 bits of each RGB component. The main SoC 12 assigns 2 bits of 6 bits that define the transparency α at positions for storing the lower 2 bits of each RGB component.

An instruction signal for setting the image blending function to be on or off is output to the video processing IC 11 via the main SoC 12 or the sub-microcomputer 13. In the AV mode, the main SoC 12 outputs an instruction signal for setting the image blending function to be off. In the camera mode, the main SoC 12 outputs an instruction signal for setting the image blending function to be on.

In the case the image blending function of the video processing IC 11 is set to be off, the blending circuit 11e outputs the video signal input from the main SoC 12 directly to the display unit 20. In the case the image blending function is set to be on, the blending circuit 11e blends the video signal input from the imaging device 2 and the video signal input from the main SoC 12 and outputs the blended signal to the display unit 20.

In the case the image blending function is set to be on, the video processing IC 11 acquires the transparent a by extracting the lower 2 bits of each RGB component and building the bits into one data array. The blending circuit 11e blends, pixel by pixel, the video signal input from the imaging device 2 and the video signal input from the main SoC 12 in a blending ratio defined by the transparency α.

In the embodiment, the format of the video signal input from the imaging device 2 and the format of the video signal input from the main SoC 12 are the same so that the blending circuit 11e can blend the signals sequentially in units of lines. It is therefore not necessary to provide a frame memory for image blending in the video processing IC 11.

It is also conceivable to cause the main SoC 12 to designate the position in which individual graphic is displayed to the video processing IC 11, instead of performing frame blending. This requires communication between the main SoC 12 and the video processing IC 11 for individual graphic and makes it difficult to synchronize the video signal from the imaging device 2 with the individual graphic. Therefore, discrepancy between the current situation estimated from the sensor information and the graphic displayed on the display unit 20 occurs easily.

Figure 6:
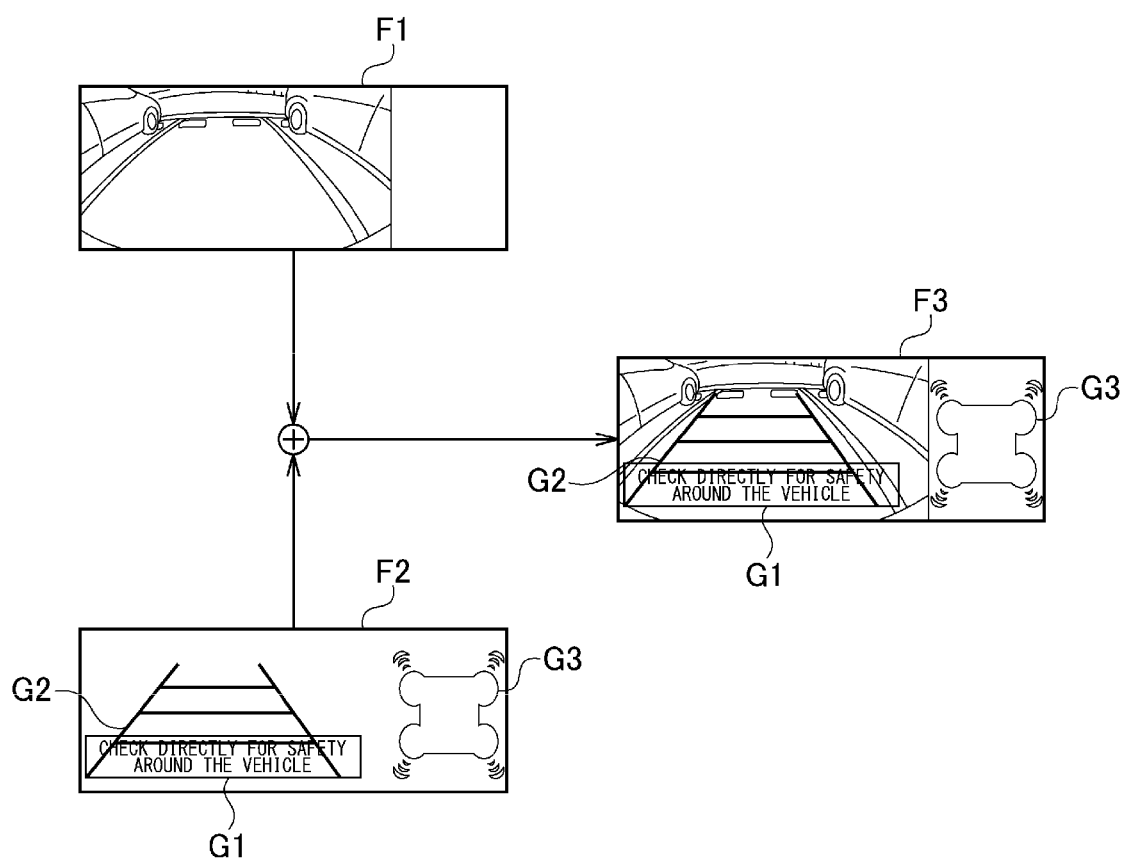
FIG. 6 shows an exemplary process for blending a video input from the imaging device with an image input from the main SoC.

FIG. 6 shows an exemplary process for blending a video F1 input from the imaging device 2 with an image F2 input from the main SoC 12. The video F1 input from the imaging device 2 is a video showing a parking space. When the driver shifts the gear to a reverse position to drive the vehicle backward for parking, the video captured by the imaging device 2 is displayed on the display unit 20. Before the main SoC 12 is started, the video F1 input from the imaging device 2 is displayed directly on the display unit 20.

The image F2 generated by the main SoC 12 includes a graphic object G1 including an alert message, a graphic object G2 of a guideline indicating a target parking position determined by the steering angle, and a graphic object G3 of the driver's vehicle icon indicating the distance to an obstacle around the vehicle.

The graphic object G2 of the guideline changes dynamically in accordance with the change in the steering angle. The number of symbol lines indicating the closeness and shown around the driver's vehicle icon indicating the distance to the obstacle changes dynamically in accordance with the distance between the driver's vehicle and the obstacle.

After the main SoC 12 is started, a video F3 in which the video F1 input from the imaging device 2 and the image F2 input from the main SoC 12 are blended is displayed on the display unit 20. The video F1 input from the imaging device 2 and blended into the video F3 is shown through the graphic object G1 that includes the alert message.

As described above, according to the embodiment, the video captured by the imaging device 2 can be displayed on the display unit 20 before the main SoC 12 is started. Since the starting time of the video processing IC 11 is short, the KT law can be complied with. Further, since the process of superimposing graphic in units of frames performed by the main SoC 12 by using the DRAM 14 does not take place, the realtimeness of the video displayed on the display unit 20 is increased. Further, it is possible to display, on the display unit 20, a video generated by the main SoC 12 and having excellently designed graphic superimposed thereon, the viewability of information can be improved, and the satisfaction of the passenger can be improved.

Further, by ensuring that the format of the video signal input from the imaging device 2 and processed in the video processing IC 11 and the format of the video signal input from the main SoC 12 are the same, the video processing IC 11 need only perform a simple frame blending process so that the load on the video processing IC 11 is inhibited from increasing. Further, since the video processing IC 11 sequentially outputs the blended video signal blended in units of lines to the display unit 20, the realtimeness of the video displayed on the display unit 20 is improved. Further, since the format of the video signal output from the main SoC 12 is fixed, it is not necessary to modify the video output interface of the main SoC 12 so that the cost for development can be controlled. Further, a change in the GUI for deployment to different places of destination only requires changing the software of the main SoC 12 so that there is no need to change the video processing IC 11 and the display unit 20. Accordingly, the cost required for deployment to different places of destination can be controlled.

Described above is an explanation based on an exemplary embodiment. The embodiment is intended to be illustrative only and it will be obvious to those skilled in the art that various modifications to constituting elements and processes could be developed and that such modifications are also within the scope of the present disclosure.

The embodiment is described above by using an example in which graphic is superimposed on the video input from a rear camera, but the imaging device 2 is not limited to a rear camera. For example, the imaging device 2 may be cameras provided at four positions including frontward, rearward, leftward, and rightward positions of the vehicle. A overhead image is generated by combining the frontward image, the rearward image, the leftward image, and the rightward image captured by these four cameras. The blending circuit 11e of the video processing IC 11 blends the overhead image thus generated with the image F2 input from the main SoC 12.

The embodiment is described above by using an example in which the format of the video signal input from the imaging device 2 and processed in the video processing IC 11 and the format of the image input from the main SoC 12 are the same. However, the embodiment does not exclude a case in which an image in a format different from that of the video input from the imaging device 2 and processed in the video processing IC 11 is superimposed on that video.

The embodiments may be defined by the following items.

[Aspect 1]

A vehicle-mounted device (1) including:

a video processing circuit (11) that outputs a video signal from an imaging device (2) for imaging a scene outside a vehicle to a display unit (20); and a main processing circuit (12) that generates an image from vehicle information and outputs the image to the video processing circuit (11), a starting time of the main processing circuit (12) being longer than that of the video processing circuit (11), wherein the video processing circuit (11) superimposes the image from the main processing circuit (12) on the video signal from the imaging device (2) and outputs a resultant video to the display unit (20).

According to this aspect, it is possible to subject the video input from the imaging device (2) to an advanced graphic process and to output it to the display unit (20), while also maintaining the realtimeness of the video.

[Aspect 2]

The vehicle-mounted device (1) according to aspect 1, wherein the main processing circuit (12) generates the image in units of frames, and the video processing circuit (11) blends the image from the main processing circuit (12) with the video signal from the imaging device (2).

According to this aspect, it is possible to simplify the superimposing process by blending the video signal input from the imaging device (2) with the image in units of frames.

[Aspect 3]

The vehicle-mounted device (1) according to aspect 1 or 2, wherein the main processing circuit (12) outputs a video signal in which each pixel in the image is defined by a red component, a green component, a blue component, and a transparency to the video processing circuit (11).

According to this aspect, it is possible to superimpose the image through which the video input from the imaging device (2) is shown.

[Aspect 4]

The vehicle-mounted device according to any one of aspects 1 through 3, wherein the main processing circuit (12) is capable of outputting a video signal from a source other than the imaging device (2) to the video processing circuit (11), the main processing circuit (12) outputs an instruction signal for setting an image blending function to be on or off to the video processing circuit (11), and in a case of outputting the video signal from a source other than the imaging device (2) to the video processing circuit (11), the main processing circuit (12) outputs an instruction signal for setting the image blending function to be off.

According to this aspect, the configuration of the video processing circuit (11) can be simplified by turning the image blending function to be on or off depending on the type of the video signal output from the main processing circuit (12) to the video processing circuit (11).

[Aspect 5]

The vehicle-mounted device (1) according to aspect 4, wherein, in a case of outputting a video signal from a source other than the imaging device (2) to the video processing circuit (11), the main processing circuit (12) outputs a video signal in which each pixel is defined by a red component, a green component, and a blue component, in a case of outputting the image to the video processing circuit (11), the main processing circuit (12) outputs a video signal in which each pixel is defined by a red component, a green component, a blue component, and a transparency, and a number of bits defining each pixel in the video signal output from the main processing circuit (12) to the video processing circuit (11) remains the same regardless of whether the video signal from a source other than the imaging device (2) is output or the image is output.

According to this aspect, the video output interface of the main processing circuit (12) can be simplified.

[Aspect 6]

The vehicle-mounted device (1) according to any one of aspects 1 through 5, wherein the imaging device (2) is a device for imaging a scene behind the vehicle.

According to this aspect, the KT law can be complied with.

CROSS-REFERENCE TO RELATED APPLICATION

This application is based upon and claims the benefit of priority from the prior Japanese Patent Application No. 2018-043551, filed on Mar. 9, 2018, the entire contents of which are incorporated herein by reference.

What is claimed is:

1. A vehicle-mounted device, comprising:
a video processing circuit that outputs a video signal from an imaging device for imaging a scene outside a vehicle to a display; and
a main processing circuit that generates an image from vehicle information and outputs the image to the video processing circuit, a starting time of the main processing circuit being longer than a starting time of the video processing circuit, wherein
the video processing circuit superimposes the image from the main processing circuit on the video signal from the imaging device and outputs a resultant video to the display,
the main processing circuit is capable of outputting a video signal from a source other than the imaging device to the video processing circuit,
the main processing circuit outputs an instruction signal for setting an image blending function to be on or off to the video processing circuit, and
in a case of outputting the video signal from the source other than the imaging device to the video processing circuit, the main processing circuit outputs the instruction signal for setting the image blending function to be off.

2. The vehicle-mounted device according to claim 1, wherein
the main processing circuit generates the image in units of frames, and
the video processing circuit blends the image from the main processing circuit with the video signal from the imaging device.

3. The vehicle-mounted device according to claim 2, wherein
the imaging device is for imaging a scene behind the vehicle.

4. The vehicle-mounted device according to claim 2, wherein
the main processing circuit outputs a video signal in which each pixel in the image is defined by a red component, a green component, a blue component, and a transparency to the video processing circuit.

5. The vehicle-mounted device according to claim 1, wherein
the main processing circuit outputs a video signal in which each pixel in the image is defined by a red component, a green component, a blue component, and a transparency to the video processing circuit.

6. The vehicle-mounted device according to claim 5, wherein
the imaging device is for imaging a scene behind the vehicle.

7. The vehicle-mounted device according to claim 1, wherein
in the case of outputting the video signal from the source other than the imaging device to the video processing circuit, the main processing circuit outputs the video signal in which each pixel is defined by a red component, a green component, and a blue component,
in a case of outputting the image to the video processing circuit, the main processing circuit outputs a video signal in which each pixel in the image is defined by the red component, the green component, the blue component, and a transparency, and
a number of bits defining each pixel is same regardless of whether the video signal from the source other than the imaging device is output or the image is output.

8. The vehicle-mounted device according to claim 7, wherein
the imaging device is for imaging a scene behind the vehicle.

9. The vehicle-mounted device according to claim 1, wherein
the imaging device is for imaging a scene behind the vehicle.

* * * * *